(12) United States Patent
Chueh et al.

(10) Patent No.: US 11,848,445 B2
(45) Date of Patent: Dec. 19, 2023

(54) RECHARGEABLE TRANSITION METAL BATTERY

(71) Applicant: NATIONAL TSING HUA UNIVERSITY, Hsinchu (TW)

(72) Inventors: Yu-Lun Chueh, Hsinchu (TW); Shu-Chi Wu, Tainan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 46 days.

(21) Appl. No.: 17/340,115

(22) Filed: Jun. 7, 2021

(65) Prior Publication Data
US 2022/0293940 A1    Sep. 15, 2022

(30) Foreign Application Priority Data

Mar. 11, 2021    (TW) ................. 110108603

(51) Int. Cl.
| | | |
|---|---|---|
| *H01M 4/58* | (2010.01) | |
| *H01M 4/136* | (2010.01) | |
| *H01M 10/052* | (2010.01) | |
| *H01M 4/62* | (2006.01) | |
| *H01M 4/36* | (2006.01) | |

(52) U.S. Cl.
CPC .......... *H01M 4/581* (2013.01); *H01M 4/136* (2013.01); *H01M 4/364* (2013.01); *H01M 4/582* (2013.01); *H01M 4/625* (2013.01); *H01M 10/052* (2013.01)

(58) Field of Classification Search
CPC ....... H01M 4/136; H01M 4/581; H01M 4/582
See application file for complete search history.

(56) References Cited

FOREIGN PATENT DOCUMENTS

| CN | 104518219 A | 4/2015 | |
|---|---|---|---|
| CN | 107251286 A | 10/2017 | |
| WO | WO-2017176229 A1 * | 10/2017 | ............. H01G 11/60 |
| WO | WO-2021081394 A1 * | 4/2021 | |

* cited by examiner

*Primary Examiner* — Stephan J Essex
(74) *Attorney, Agent, or Firm* — CKC & Partners Co., LLC

(57) ABSTRACT

A rechargeable transition metal battery includes a negative electrode, a positive electrode and an electrolyte. The negative electrode includes a negative electrode material which is a transition metal or an alloy of the transition metal. The positive electrode is electrically connected to the negative electrode and includes a host material and a positive electrode material. The host material includes a carbon. The positive electrode material is connected to the host material, and the positive electrode material is a compound of a metal, an elemental chalcogen or an elemental halogen. The electrolyte is disposed between the positive electrode and the negative electrode.

11 Claims, 7 Drawing Sheets

RECHARGEABLE TRANSITION METAL BATTERY

RELATED APPLICATIONS

This application claims priority to Taiwan Application Serial Number 110108603, filed Mar. 11, 2021, which is herein incorporated by reference.

BACKGROUND

Technical Field

The present disclosure relates to a rechargeable battery. More particularly, the present disclosure relates to a rechargeable transition metal battery.

Description of Related Art

The development of high-capacity rechargeable batteries is important to the field of the electronics industry, electric vehicles, renewable energy and other industries. Most of the commercial batteries on the market currently use alkali metal as working ions, such as lithium battery or sodium battery. However, the alkali metals are active, flammable, inconvenient processing and have serious dendrite problem, so the development thereof is still restricted.

Therefore, how to strike a balance between electric capacity and battery stability has become the goal of the relevant industry.

SUMMARY

According to one aspect of the present disclosure, a rechargeable transition metal battery includes a negative electrode, a positive electrode and an electrolyte. The negative electrode includes a negative electrode material which is a transition metal or an alloy of the transition metal. The positive electrode is electrically connected to the negative electrode and includes a host material and a positive electrode material. The host material includes a carbon. The positive electrode material is connected to the host material, and the positive electrode material is a compound of a metal, an elemental chalcogen or an elemental halogen. The electrolyte is disposed between the positive electrode and the negative electrode.

These and other features, aspects, and advantages of the present disclosure will become better understood with reference to the following description and appended claims.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
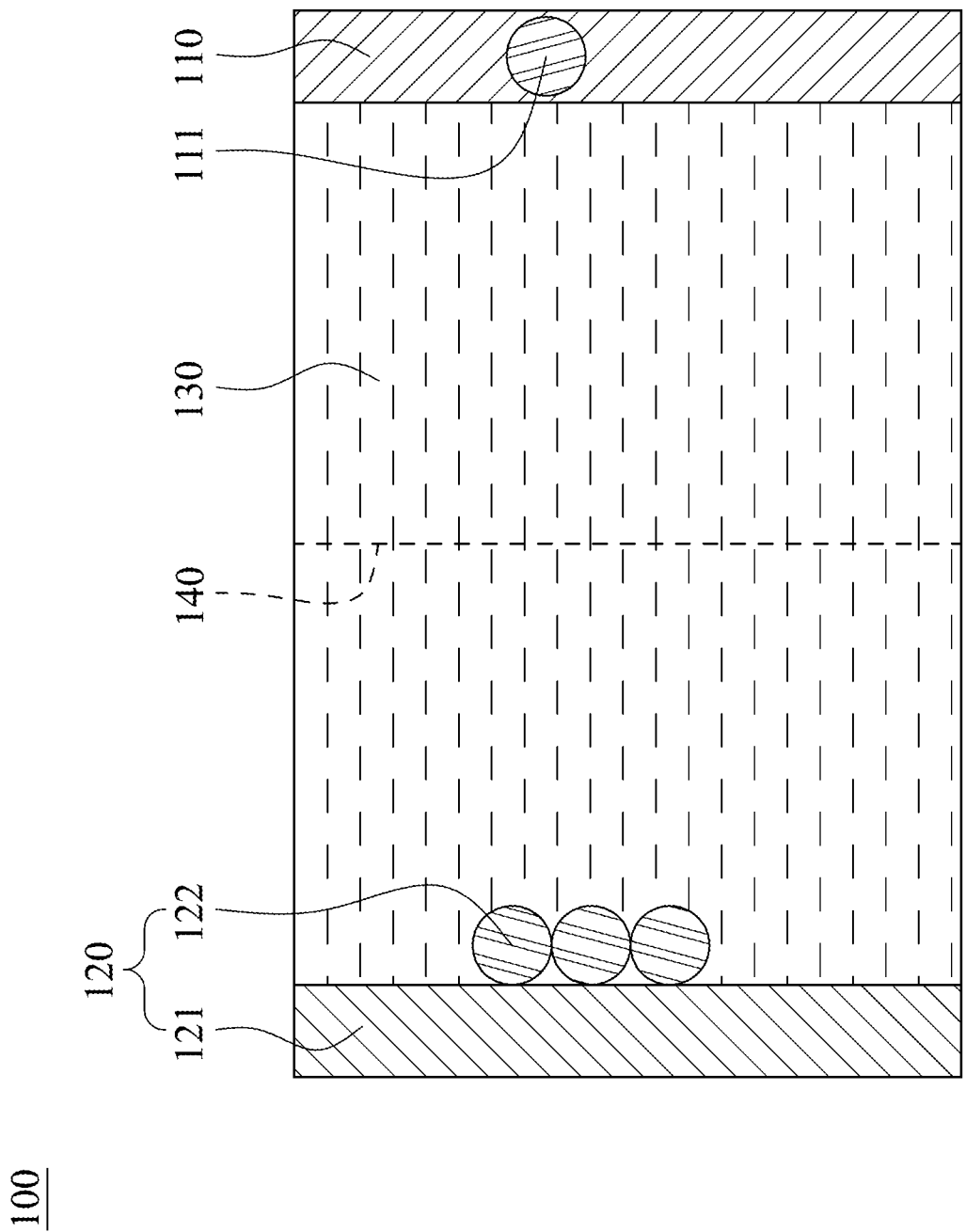
FIG. 1 is a schematic view of a rechargeable transition metal battery according to one embodiment of the present disclosure.

Please refer to FIG. 1. FIG. 1 is a schematic view of a rechargeable transition metal battery 100 according to one embodiment of the present disclosure. As shown in FIG. 1, the rechargeable transition metal battery 100 includes a negative electrode 110, a positive electrode 120 and an electrolyte 130. The negative electrode 110 includes a negative electrode material 111 which is a transition metal or an alloy of the transition metal. The positive electrode 120 is electrically connected to the negative electrode 110, and the positive electrode 120 includes a host material 121 and a positive electrode material 122. The positive electrode material 122 is connected to the host material 121, wherein the host material 121 includes carbon, and the positive electrode material 122 is a compound of a metal, an elemental chalcogen or an elemental halogen. The electrolyte 130 is disposed between the positive electrode 120 and the negative electrode 110.

In the embodiment of FIG. 1, the negative electrode 110 can be a sheet form or a powder form. The host material 121 can be a carbon fiber, a carbon nanotube, a carbon black or other carbon-based material. The host material 121 is used as the current collector of the positive electrode 120, but the present disclosure will not be limited thereto.

The rechargeable transition metal battery 100 can further include a separator 140. The separator 140 is disposed between the negative electrode 110 and the positive electrode 120, and is disposed in the electrolyte 130. The separator 140 is used to prevent the negative electrode 110 from directly contacting the positive electrode 120, and to ensure that ions can be transferred in the electrolyte 130.

Specifically, the transition metal of the negative electrode material 111 of the negative electrode 110 and the metal of the positive electrode 120 can be Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Sn, Pb, Bi, Sc, Y, lanthanide or actinide, respectively.

In the embodiment of FIG. 1, the positive electrode material 122 can be embedded on the host material 121. The compound of the metal of the positive electrode material 122 of the positive electrode 120 can be a chalcogen compound of the metal, a pnictide compound of the metal, a halide of the metal or a salt of the metal, wherein the chalcogen compound of the metal can be a metal oxide, a metal sulfide, a metal selenide or a metal telluride, the pnictide compound of the metal can be a metal nitride or a metal phosphide, the halide of the metal can be a metal fluoride, a metal chloride, a metal bromide or a metal iodide, and the salt of the metal can be a metal phosphinate, a metal borate, a metal perchlorate, a metal hypochlorite, a metal acetate, a metal phosphite, a metal sulfate, a metal sulfite, a metal carbonate, a metal oxalate or a metal phosphate. Further, the elemental chalcogen of the positive electrode material 122 can be S, Se or Sb, and the elemental halogen can be F, Cl, Br or I.

The electrolyte 130 can be formed by mixing a first compound, a second compound and a third compound. The first compound can be a Lewis acid or a Brønsted base. The second compound can be a Lewis base. The third compound can be an organic amine, a quaternary phosphonium salt, an organic sulfonium ion or an organic heterocyclic compound. The Lewis acid and the Brønsted base can be an organic alcohol, an organic acid or an organic amine, and the Lewis base can be water, a metal halide, a metal oxide or a metal salt.

In detail, the organic alcohol can be ethylene glycol, glycerol, pentaerythritol or derivatives of the organic alcohol. The organic acid can be chloroacetic acid, dichloroacetic acid, propanedioic acid, alanine, acetic acid, ethanedioic acid, citric acid, serine, benzoic acid, phenylacetic acid, phenylpropionic acid, p-toluenesulfonic acid, 5-sulfosalicylic acid dehydrate, trifluoromethanesulfonic acid or derivatives of the organic acid. The organic amine of the first compound can be carbamide, thiourea, acetamide, thioacetamide or derivatives of the organic amine. The metal halide can be metal fluoride, metal chloride, metal bromide or metal iodide. The metal salt can be hypophosphite, borate, perchlorate, hypochlorite, acetate, phosphite, sulfate, sulfite, carbonate, oxalate or phosphate. The organic amine of the third compound can be primary amine, secondary amine, tertiary amine, quaternary ammonium salt or derivatives of the organic amine. The organic heterocyclic compound can be furan, pyrrole, thiophene, imidazole, pyrazole, oxazole, isoxazole, thiazole, pyridine, pyrazine, pyrimidine, pyridazine or derivatives of fused ring.

The alkaline metal battery is common on the market, such as lithium battery or sodium battery. The alkaline metal is active, flammable, and has serious dendrite problem that causes inconvenience in processing. However, being different from the general alkaline metal battery, the rechargeable transition metal battery 100 of present disclosure uses the transition metal ions as working ions. The transition metal is quite stable and not spontaneous combustion in air, which is conducive to the convenience of processing. Therefore, the complexity of the manufacturing process of the rechargeable transition metal battery 100 can be reduced, and the manufacturing cost thereof can be also effectively reduced.

Further, the electrolyte 130 is more stable than the carbonic ester electrolyte of the conventional lithium battery which is unstable and flammable. By the abovementioned arrangement of the electrolyte 130, the electrolyte 130 of present disclosure is non-flammable and has high tolerance to moisture and oxygen, which is safer to use.

Figure 2:
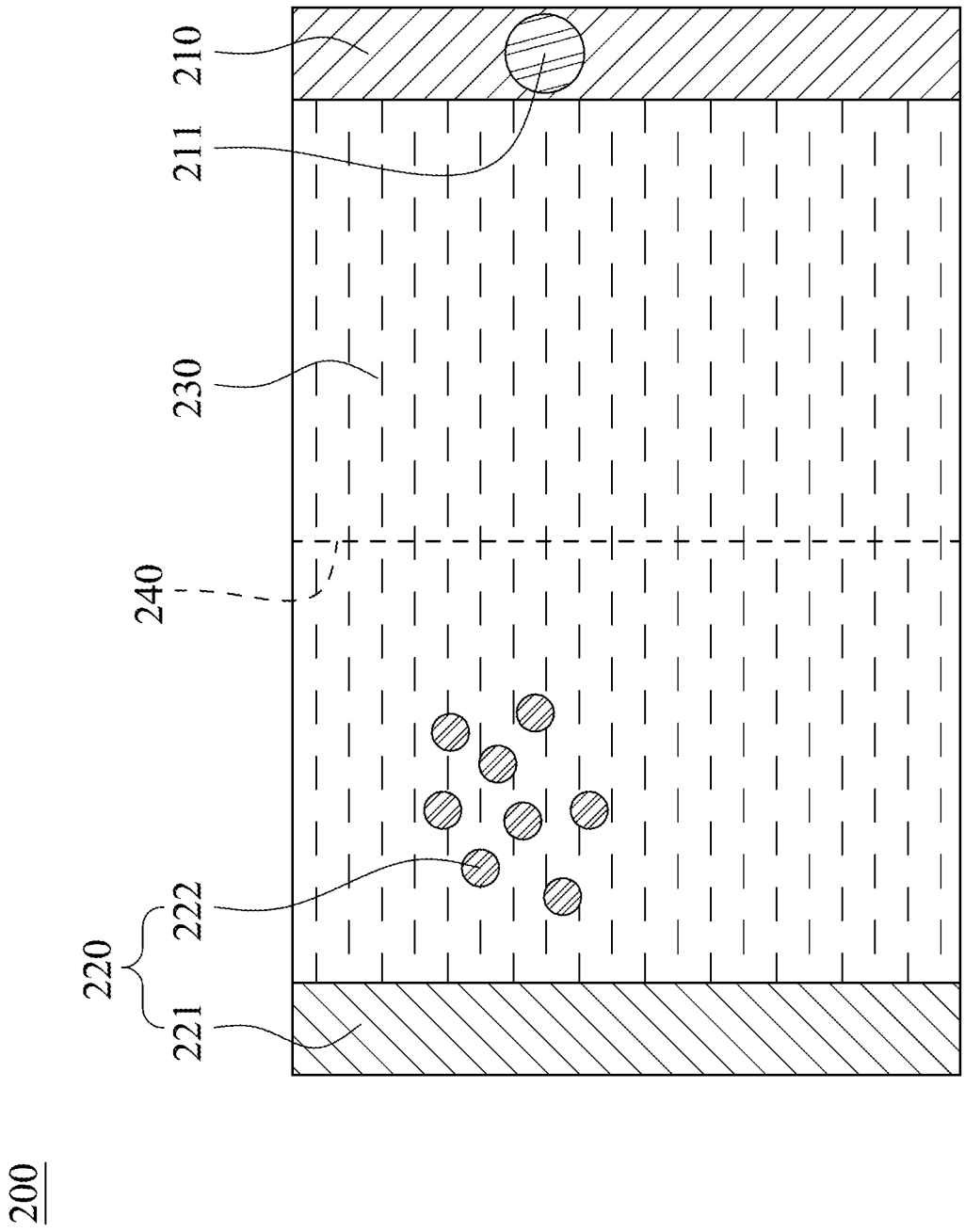
FIG. 2 is a schematic view of a rechargeable transition metal battery according to another embodiment of the present disclosure.

Please refer to FIG. 2. FIG. 2 is a schematic view of a rechargeable transition metal battery 200 according to another embodiment of the present disclosure. As shown in FIG. 2, the rechargeable transition metal battery 200 includes a negative electrode 210, a positive electrode 220, an electrolyte 230, and a separator 240. The negative electrode 210 includes a negative electrode material 211. The positive electrode 220 includes a host material 221 and a positive electrode material 222. It should be mentioned that, the structure and detailed features of the rechargeable transition metal battery 200 of FIG. 2 are similar to those of the rechargeable transition metal battery 100 of FIG. 1, and the similarities are not described herein again.

In the embodiment of FIG. 2, the positive electrode material 222 is the compound of the metal, and the positive electrode material 222 can be dissolved in the electrolyte 230. The positive electrode material 222 can be electrically connected to the host material 221 and can be used as a catholyte. Therefore, it can increase the dispersion and uniformity of the positive electrode material 222 on the host material 221, and the utilization rate of the positive electrode material 222 can be improved. Further, the operation of the rechargeable transition metal battery 200 can be more convenient.

The operation and charging and discharging principle of the rechargeable transition metal battery of present disclosure will be described below. The first embodiment, the second embodiment and the third embodiment are divided according to the difference of the positive electrode material.

In the first embodiment, the positive electrode material is the elemental chalcogen, the host material is the carbon nanotube, and the negative electrode material is the transition metal, wherein the positive electrode material is embedded on the host material. When the rechargeable transition metal battery is discharging, the transition metal of the negative electrode material loses its electrons and becomes a transition metal ion, which migrates to the positive electrode through the electrolyte and reacts with the elemental chalcogen of the positive electrode material. As discharging progresses, the product of the positive electrode is gradually transformed from transition metal polychalcogenide to transition metal chalcogenide. When the rechargeable transition metal battery is charging, the transition metal chalcogenide is oxidized to release the transition metal ions, and the transition metal chalcogenide is converted into elemental chalcogen, then the transition metal ions migrate back to the negative electrode and deposit as elemental transition metal.

In the second embodiment, the positive electrode material is the elemental halogen, the host material is the carbon nanotube, and the negative electrode material is the transition metal, wherein the positive electrode material is embedded on the host material. When the rechargeable transition metal battery is discharging, the transition metal of the negative electrode material loses its electrons and becomes a transition metal ion, which migrates to the positive electrode through the electrolyte and reacts with the elemental halogen of the positive electrode material. As discharging progresses, the product of the positive electrode is gradually transformed from transition metal polyhalide to transition metal halide. When the rechargeable transition metal battery is charging, the transition metal halide is oxidized so as to release transition metal ions, and the transition metal halide is converted into elemental halogen, then the transition metal ions migrate back to the negative electrode and deposit as elemental transition metal.

In the third embodiment, the positive electrode material is the metal oxide or the salt of the metal, the host material is the carbon fiber, and the negative electrode material is the transition metal, wherein the positive electrode material is dissolved in the electrolyte. When the rechargeable transition metal battery is discharging, the transition metal of the negative electrode material loses its electrons and becomes a transition metal ion, which is dissolved in the electrolyte. As discharging progresses, the product of the positive electrode gradually transforms from high-valent metal oxides into low-valent metal ions and dissolves into the electrolyte. On the contrary, when the rechargeable transition metal battery is charging, the transition metal complex or salt is oxidized to convert the metal ions in the electrolyte to high-valent metal oxides, and the transition metal ions migrate back to the negative electrode to be deposited as elemental transition metal.

In order to clearly illustrate the performance of the rechargeable transition metal battery of the present disclosure, it is illustrate with the actual experimental data below. Example 1, Example 2, Example 3, Example 4, Example 5 and Example 6 are divided according to the difference of the positive electrode material and the negative electrode material. In detail, Example 1 is a Zn—MnO battery, Example 2 is a Zn—Mn(CH$_3$COO)$_2$ battery, Example 3 is a Zn—S battery, Example 4 is a Ni—S battery, Example 5 is a Ni—I battery and Example 6 is a CoO—I—Zn battery. Please refer to the following Table 1, Table 2 and Table 3 together. Tables 1 to 3 record the formulas and proportions of each example, respectively.

The formula and ratio of the electrolyte of each example are shown in Table 1 below.

TABLE 1

|  | choline chloride (mol %) | ethylene glycol (mol %) | p-toluenesulfonic acid (mol %) |
|---|---|---|---|
| Example 1 | 10-50 | 10-50 | 10-50 |
| Example 2 | 10-50 | 10-50 | 10-50 |
| Example 3 | 30-50 | 50-70 | — |
| Example 4 | 30-50 | 50-70 | — |
| Example 5 | 30-50 | 50-70 | — |
| Example 6 | 30-50 | 50-70 | — |

The formula and ratio of the salt of the electrolyte in each example are shown in Table 2 below.

TABLE 2

|  | MnO (M) | Mn(CH$_3$COO)$_2$ (M) | ZnCl$_2$ (M) | NiCl$_2$ (M) | CoO (M) |
|---|---|---|---|---|---|
| Example 1 | 0.1-2.0 | — | 0.1-2.0 | — | — |
| Example 2 | — | 0.1-2.0 | 0.1-2.0 | — | — |
| Example 3 | — | — | 0.1-2.0 | — | — |
| Example 4 | — | — | — | 0.1-2.0 | — |
| Example 5 | — | — | — | 0.1-2.0 | — |
| Example 6 | — | — | — | — | 0.1-2.0 |

The formula of the positive electrode material, the host material and the negative electrode material of each example are shown in Table 3 below.

TABLE 3

|  | host material | positive electrode material | negative electrode material |
|---|---|---|---|
| Example 1 | carbon fiber | MnO | Zn |
| Example 2 | carbon fiber | Mn(CH$_3$COO)$_2$ | Zn |
| Example 3 | carbon nanotube | S | Zn |
| Example 4 | carbon nanotube | S | Ni |
| Example 5 | carbon nanotube | I | Ni |
| Example 6 | carbon nanotube | I | Zn |

Figure 4:
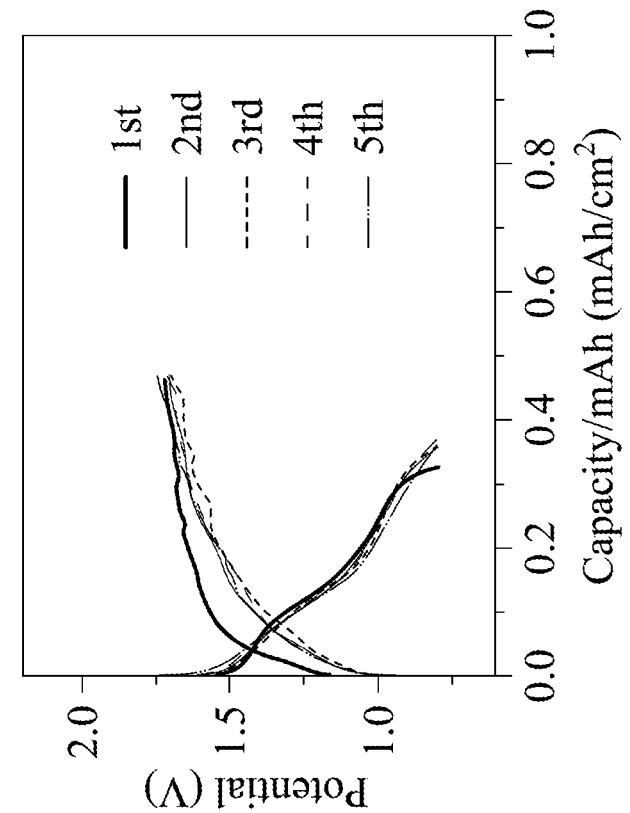
FIG. 4 is a charge and discharge curve diagram of Example 2.
Figure 3:
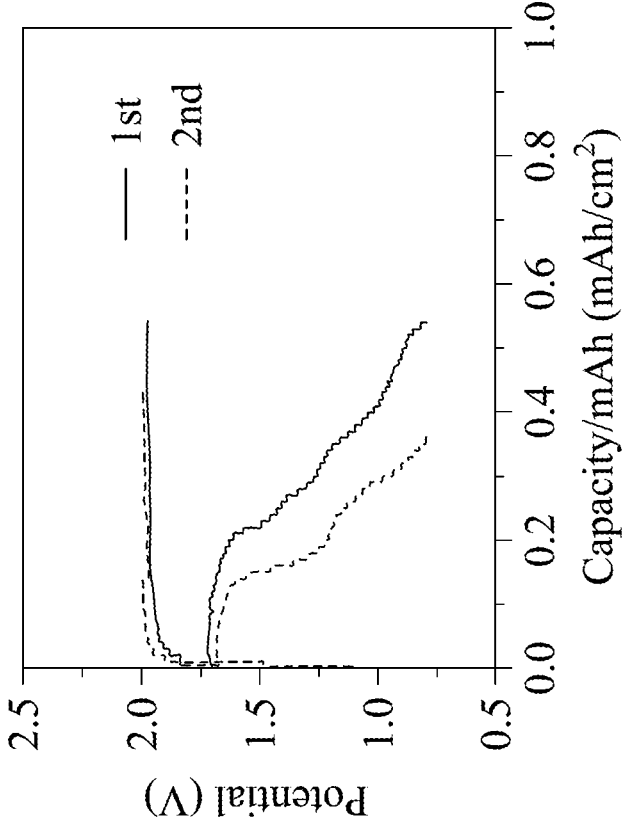
FIG. 3 is a charge and discharge curve diagram of Example 1.
Figure 6:
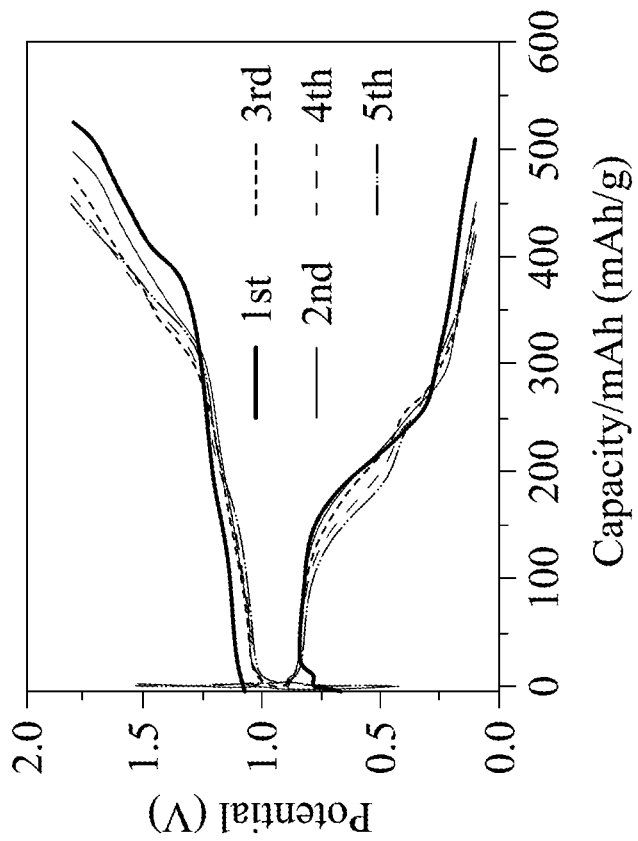
FIG. 6 is a charge and discharge curve diagram of Example 3.
Figure 5:
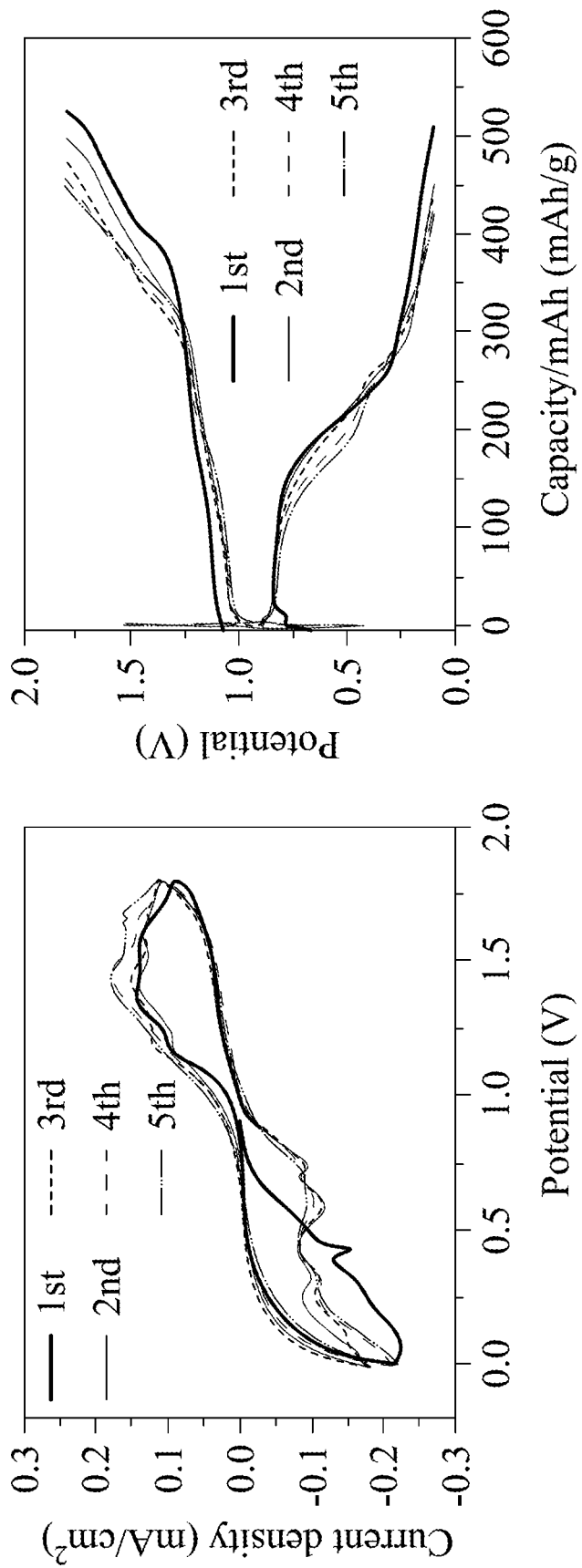
FIG. 5 is a cyclic voltammogram of Example 3.
Figure 8:
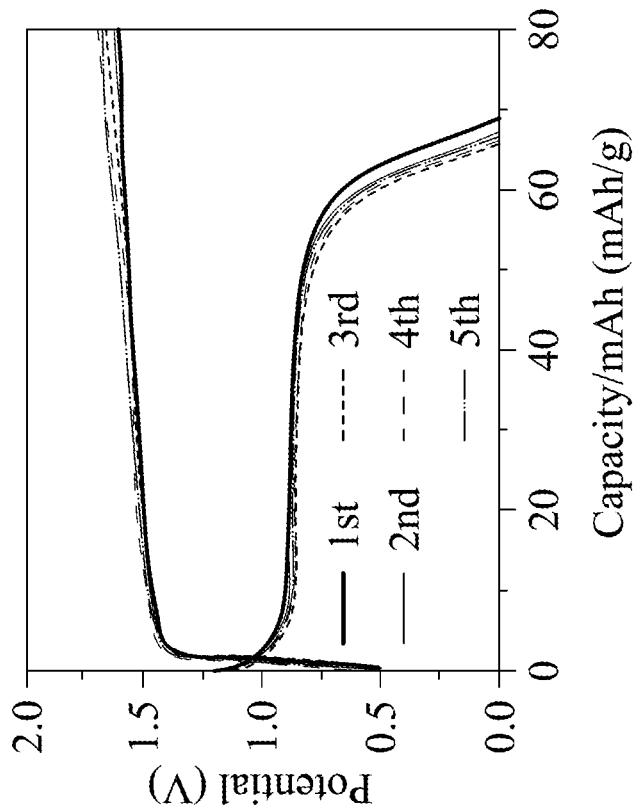
FIG. 8 is a charge and discharge curve diagram of Example 4.
Figure 7:
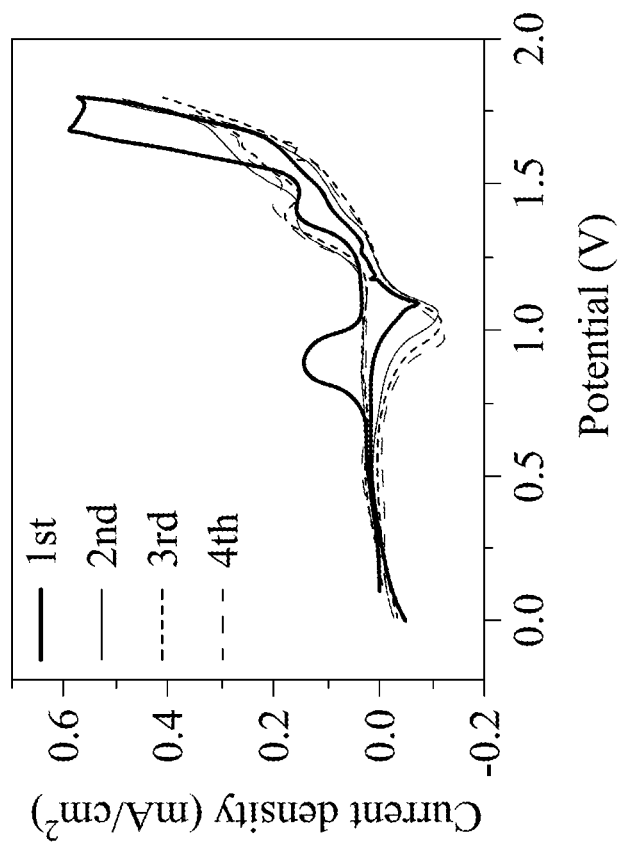
FIG. 7 is a cyclic voltammogram of Example 4.
Figure 9:
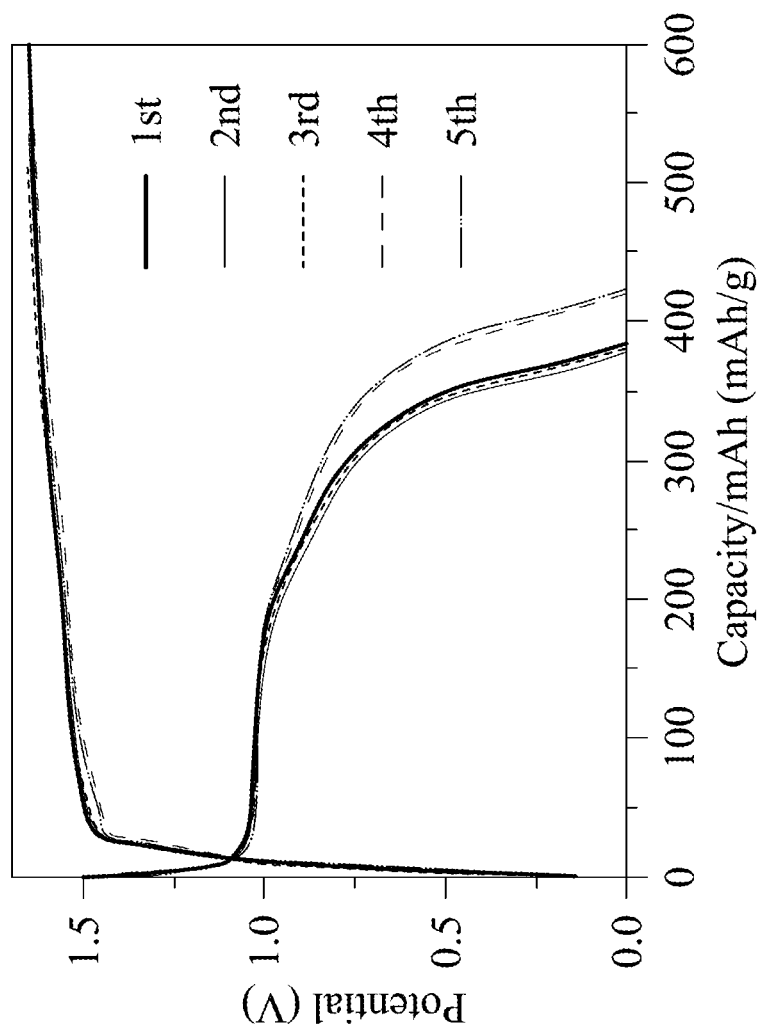
FIG. 9 is a charge and discharge curve diagram of Example 5.
Figure 10:
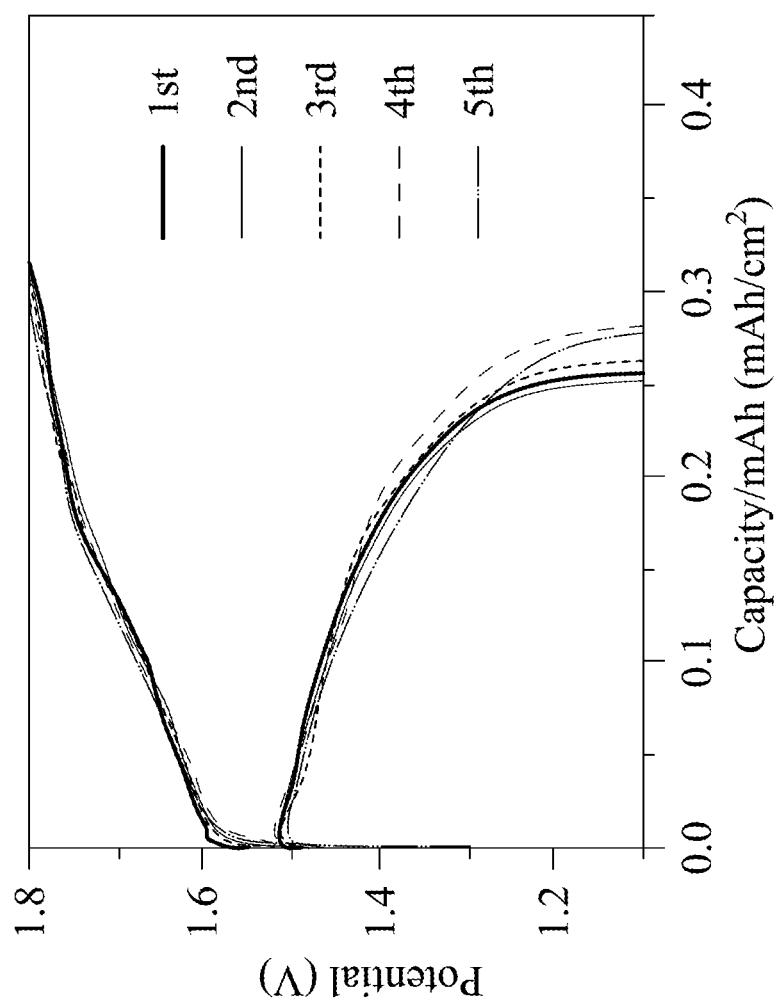
FIG. 10 is a charge and discharge curve diagram of Example 6.

Please refer to FIG. 3, FIG. 4, FIG. 5, FIG. 6, FIG. 7, FIG. 8, FIG. 9 and FIG. 10. FIG. 3 is a charge and discharge curve diagram of Example 1. In FIG. 3, the charge and discharge test of Example 1 is carried out for two times. FIG. 4 is a charge and discharge curve diagram of Example 2. In FIG. 4, the cyclic voltammetry (CV) test of Example 2 is carried out for five times. FIG. 5 is a cyclic voltammogram of Example 3. In FIG. 5, the CV test of Example 3 is carried out for five times. FIG. 6 is a charge and discharge curve diagram of Example 3. In FIG. 6, the charge and discharge test of Example 3 is carried out for five times. FIG. 7 is a cyclic voltammogram of Example 4. In FIG. 7, the charge and discharge test of Example 4 is carried out for four times. FIG. 8 is a charge and discharge curve diagram of Example 4. In FIG. 8, the CV test of Example 4 is carried out for five times. FIG. 9 is a charge and discharge curve diagram of Example 5. In FIG. 9, the charge and discharge test of Example 5 is carried out for five times. FIG. 10 is a charge and discharge curve diagram of Example 6. FIG. 10, the charge and discharge test of Example 6 is carried out for five times.

As shown in FIGS. 3 and 4, both Example 1 and Example 2 have good capacitance performance and reversible charge and discharge curves. As shown in FIGS. 5 and 7, Example 4 and Example 5 have reversible oxidation and reduction peaks. As shown in FIGS. 6 and 8, both Example 1 and Example 2 have good capacitance performance. Further, as shown in FIGS. 9 and 10, both Example 5 and Example 6 have good capacitance performance and reversible charge and discharge curves.

In conclusion, by selecting the transition metal ions as working ions, the rechargeable transition metal battery of present disclosure has the advantages of good cycle performance, stable flame resistance, no dendrite problem to be easy processed, low cost, and being stable and safe. Therefore, the rechargeable transition metal battery of present disclosure has great application prospects.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A rechargeable transition metal battery, comprising:
    a negative electrode comprising:
        a negative electrode material which is a transition metal or an alloy of the transition metal;
    a positive electrode electrically connected to the negative electrode and comprising:
        a host material comprising a carbon; and
        a positive electrode material connected to the host material, and the positive electrode material is a compound of a metal, an elemental chalcogen or an elemental halogen; and
    an electrolyte disposed between the positive electrode and the negative electrode, wherein the electrolyte is a eutectic mixture formed by mixing a first compound, a second compound and a third compound, the first compound is an organic alcohol, an organic acid or an organic amine, the second compound is a transition metal halide, a transition metal oxide or a transition metal salt, and the third compound is a choline chlorid, and the electrolyte is not gelled;
    wherein when the rechargeable transition metal battery is discharging, a transition metal ion is released from the negative electrode material of the negative electrode, and the transition metal ion migrates to the positive electrode, and when the rechargeable transition metal battery is charging, the transition metal ion migrates from the positive electrode back to the negative electrode to form the negative electrode material;
    wherein the rechargeable transition metal battery uses the transition metal ion as a working ion.

2. The rechargeable transition metal battery of claim 1, wherein the transition metal is Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, TI, Sn, Pb, Bi, Sc, Y, lanthanide or actinide.

3. The rechargeable transition metal battery of claim 1, wherein the positive electrode material is embedded on the host material.

4. The rechargeable transition metal battery of claim 1, wherein the positive electrode material is the compound of the metal, and the positive electrode material is dissolved in the electrolyte.

5. The rechargeable transition metal battery of claim 1, wherein the metal is Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, TI, Sn, Pb, Bi, Sc, Y, lanthanide or actinide.

6. The rechargeable transition metal battery of claim 5, wherein the compound of the metal is a chalcogen compound of the metal, a pnictide compound of the metal, a halide of the metal or a salt of the metal.

7. The rechargeable transition metal battery of claim 6, wherein the chalcogen compound of the metal is a metal oxide, a metal sulfide, a metal selenide or a metal telluride, the pnictide compound of the metal is a metal nitride or a metal phosphide, the halide of the metal is a metal fluoride, a metal chloride, a metal bromide or a metal iodide, and the salt of the metal is a metal phosphinate, a metal borate, a metal perchlorate, a metal hypochlorite, a metal acetate, a metal phosphite, a metal sulfate, a metal sulfite, a metal carbonate, a metal oxalate or a metal phosphate.

8. The rechargeable transition metal battery of claim 1, wherein the elemental chalcogen is S, Se or Te, and the elemental halogen is F, Cl, Br or I.

9. The rechargeable transition metal battery of claim 1, wherein the host material is a carbon fiber, a carbon nanotube or a carbon black.

10. The rechargeable transition metal battery of claim 1, wherein the negative electrode is a sheet form or a powder form.

11. The rechargeable transition metal battery of claim 1, further comprising a separator, wherein the separator is disposed between the negative electrode and the positive electrode, and is disposed in the electrolyte.

\* \* \* \* \*